(12) United States Patent
Liu

(10) Patent No.: US 8,315,380 B2
(45) Date of Patent: Nov. 20, 2012

(54) ECHO SUPPRESSION METHOD AND APPARATUS THEREOF

(75) Inventor: Encai Liu, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 308 days.

(21) Appl. No.: 12/837,658

(22) Filed: Jul. 16, 2010

(65) Prior Publication Data

US 2011/0019831 A1 Jan. 27, 2011

(30) Foreign Application Priority Data

Jul. 21, 2009 (JP) .................................. 2009-169865

(51) Int. Cl.
*H04M 9/08* (2006.01)
(52) U.S. Cl. .......... 379/406.08; 379/406.03; 379/406.13
(58) Field of Classification Search ............. 379/406.01, 379/406.08, 406.06, 406.03, 392.01, 406.13
See application file for complete search history.

(56) References Cited

U.S. PATENT DOCUMENTS

| | | | |
|---|---|---|---|
| 4,644,108 A | 2/1987 | Crouse et al. | |
| 2006/0018457 A1* | 1/2006 | Unno et al. | 379/388.04 |
| 2006/0197688 A1* | 9/2006 | Chan | 341/50 |
| 2009/0304200 A1* | 12/2009 | Kim et al. | 381/71.11 |
| 2010/0239098 A1* | 9/2010 | Christoph | 381/56 |
| 2011/0058667 A1* | 3/2011 | Takada | 379/406.08 |
| 2011/0123019 A1* | 5/2011 | Gowreesunker et al. | 379/406.09 |

FOREIGN PATENT DOCUMENTS

| | | |
|---|---|---|
| JP | 59080029 | 5/1984 |
| JP | 2000-138619 | 5/2000 |

OTHER PUBLICATIONS

J-S. Soo and K. Pang, *Multidelay Block Frequency Domain Adaptive Filter*, IEEE Trans. Acoust. Speech Signal Process., vol. ASSP-38, No. 2, pp. 373-376, Feb. 1990.

Doblinger G., *Computationally Effectient Speech Enhancement by Spectral Minima Tracking in Subbands*, Proc. Eurospeech, 2, pp. 1513-1516, 1995.

* cited by examiner

*Primary Examiner* — Olisa Anwah
(74) *Attorney, Agent, or Firm* — Morrison & Foerster LLP

(57) ABSTRACT

In an echo suppression apparatus, an adaptive filter estimates an echo path of a near end, and generates a pseudo echo signal of a reception signal received from a far end. A subtractor subtracts the pseudo echo signal from a near-end signal including an echo signal of the reception signal, a near-end sound and a background noise, thereby generating an echo-canceled signal. A background noise estimation unit estimates a spectrum of the background noise. A non-linear processing unit performs spectrum subtraction of the estimated spectrum of the background noise from the spectrum of the echo-canceled signal, and controls a gain of the spectrum of the echo-canceled signal in response to the result of the spectrum subtraction, thereby obtaining a spectrum of a transmission signal transmitted to the far end. A threshold calculation unit calculates a threshold value used to determine presence or absence of the residual echo in the echo-canceled signal. The non-linear processing unit compares the result of the spectrum subtraction with the threshold value, then controls the spectrum of the echo-canceled signal with a high gain in case that the result of the spectrum subtraction is higher than the threshold value, and with a low gain in case that the result of the spectrum subtraction is not higher than the threshold value.

7 Claims, 6 Drawing Sheets

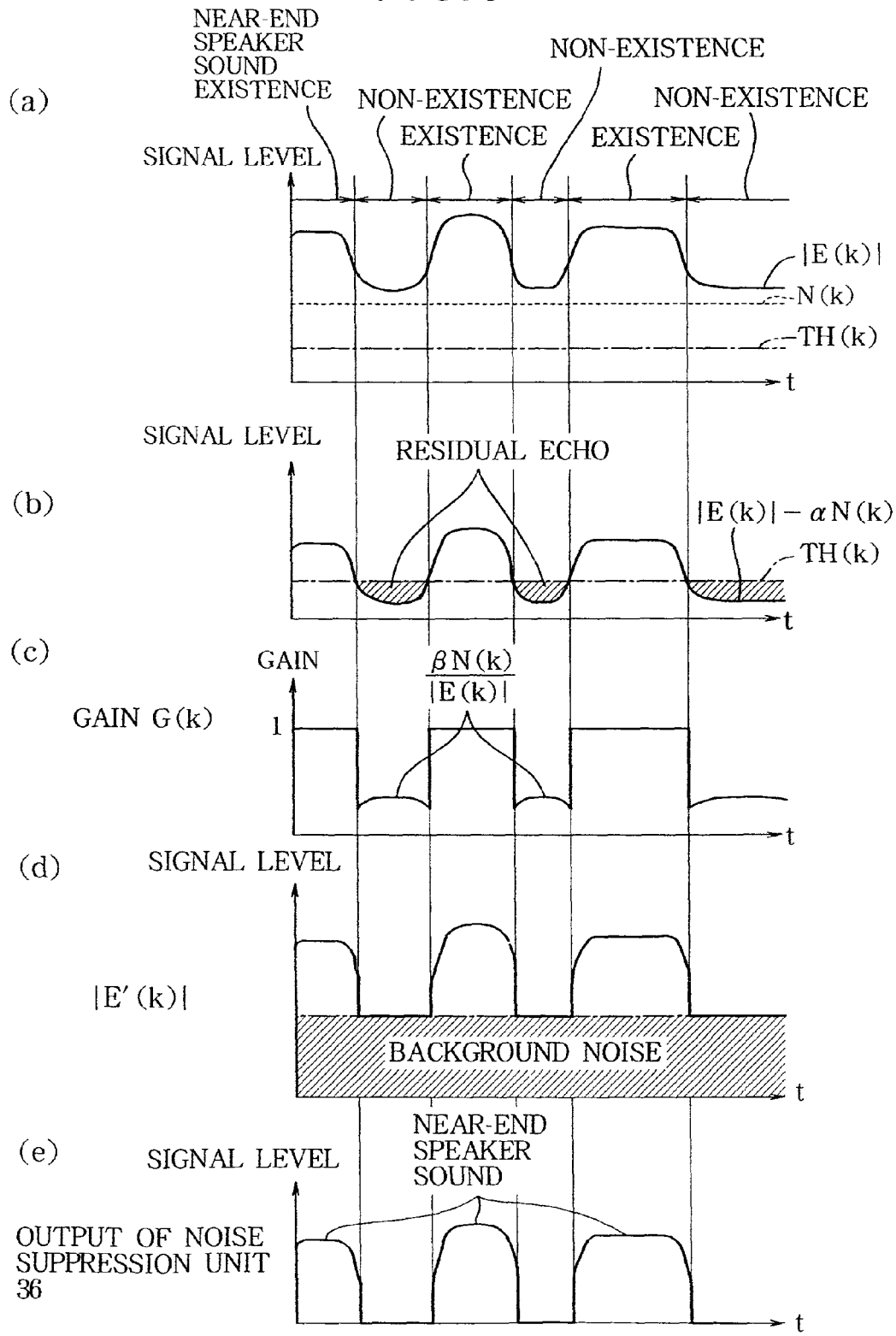

ECHO SUPPRESSION METHOD AND APPARATUS THEREOF

BACKGROUND OF THE INVENTION

Technical Field of the Invention

The present invention relates to an echo suppression method and apparatus for use in a mobile phone, a television telephone system, a voice conference system, a telephone line, and the like, and more particularly to a method and apparatus for precisely suppressing a residual echo during a non-linear process to be performed after an echo cancellation process even when a background noise level is high.

Conventional echo suppression apparatuses have been disclosed in the following Patent References 1 and 2. An echo suppression apparatus of Patent Reference 1 is shown in FIG. 2. The echo suppression apparatus shown in FIG. 2 estimates an echo return loss R from transmission signal energy M and reception signal energy D, and calculates estimated energy E of an echo signal of a certain moment using an equation 'E=D×R'. If the transmission signal energy M is higher than the estimated energy E, it is determined that the transmission signal is a near-end voice signal, and a switch 10 is turned on, such that the transmission signal is transmitted to the far end. If the transmission signal energy M is not higher than the estimated energy E, it is determined that the transmission signal is an echo, and the switch 10 is turned off, such that the echo signal is not transmitted to the far end.

An echo suppression apparatus of Patent Reference 2 is shown in FIG. 3. The adaptive filter unit 12 estimates an impulse response (transfer function) of an echo path using an adaptive filter, generates a pseudo echo signal from the estimated impulse response, subtracts the pseudo echo signal from a transmission signal, and thus performs echo cancellation. The residual echo not cancelled by the adaptive filter unit 12 is attenuated by a Non-Linear Processing (NLP) attenuation unit 14. That is, the NLP attenuation unit 14 allocates a specific loss (for example, a loss value of 30 dB) to a signal (hereinafter referred to as an "echo-canceled signal") generated after echo cancellation is performed by the adaptive filter unit 12. The NLP attenuation unit 14 operates in such a manner that it has no loss (e.g., a loss value of 0 dB) when no echo is generated. By the above-mentioned operation, in the case where the loss is allocated to the signal, the residual echo can be attenuated down to a specific level where it is impossible for the user to listen to the residual echo. In order to reduce discontinuity of a background noise caused by the NLP operation, a pseudo background noise, which has the same level and the same frequency components as those of a background noise, is inserted into a transmission signal, and the resultant transmission signal is transmitted to a far end.

[Patent Reference 1] Japanese Patent Application Publication No. Showa 59-80029
[Patent Reference 2] Japanese Patent Application Publication No. 2000-138619
[Non-Patent Reference 1]
J.-S. Soo and K. Pang, "Multidelay block frequency domain adaptive filter", IEEE Trans. Acoust. Speech signal Process., vol. ASSP-38, No. 2, pp. 373-376, February 1990.
[Non-Patent Reference 2] Doblinger G., "Computationally efficient speech enhancement by spectral minima tracking in subbands", Proc. Eurospeech, 2, pp. 1513-1516, 1995.

In the echo suppression apparatus disclosed in Patent Reference 1, in the case where a near-end background noise is contained in a transmission signal, the background noise is transmitted or blocked according to on/off operations of a switch 10, such that a far-end background noise becomes intermittently unnatural, such that a call quality or speech quality may be greatly deteriorated.

The echo suppression apparatus disclosed in Patent Reference 2 inserts a pseudo background noise into a signal attenuated by an NLP operation, such that it can solve the problem caused by transmission/blocking of the background noise. However, as a matter of fact, it is impossible to sufficiently reproduce a real background noise using the pseudo background noise, such that it is impossible for the pseudo background noise to sufficiently solve unnaturalness of the background noise sound quality caused by the NLP operation.

In addition, the echo suppression apparatus disclosed in Patent References 1 and 2 do not consider the influence of background noise in determining whether all transmission signals are transmitted or blocked (or attenuated). For example, in the case of the echo suppression apparatus disclosed in Patent Reference 1, if a background noise contained in the transmission signal is at a high level, the switch 10 is turned on although the transmission signal is not a near-end voice signal but a residual echo signal, such that the possibility of transmitting the residual echo signal to the far end without any change may be increased.

SUMMARY OF THE INVENTION

The present invention has been made to overcome the above problems, and it is an object of the present invention to provide an echo suppression apparatus and method for precisely suppressing a residual echo even though a background noise level is high.

In order to solve the above problems, an echo suppression apparatus according to the present invention comprises: an adaptive filter unit that estimates an echo path of a near end, and that generates a pseudo echo signal of a reception signal received from a far end; a subtractor that subtracts the pseudo echo signal from a near-end signal including an echo signal of the reception signal, a near-end sound and a background noise, and that generates an echo-canceled signal as a result of subtraction; a background noise estimation unit that estimates a spectrum of the background noise; a non-linear processing unit that performs spectrum subtraction to subtract the estimated spectrum of the background noise from a spectrum of the echo-canceled signal, and that controls a gain of the spectrum of the echo-canceled signal for each of frequency bands (e.g., at every band divided by a Discrete Fourier Transform) of the spectrum of the echo-canceled signal in response to a result of the spectrum subtraction, thereby obtaining a spectrum of a transmission signal transmitted to the far end; and a threshold calculation unit that calculates a threshold value for each of the frequency bands, the threshold value being used to determine presence or absence of a residual echo in the echo-canceled signal, wherein the non-linear processing unit compares the result of the spectrum subtraction with the threshold value in each of the frequency bands, then controls the spectrum of the echo-canceled signal with a high gain in a frequency band where the result of the spectrum subtraction is higher than the threshold value, and controls the spectrum of the echo-canceled signal with a low gain in another frequency band where the result of the spectrum subtraction is not higher than the threshold value, the low gain being set to lower than the high gain.

The echo suppression apparatus according to the embodiment of the present invention estimates a spectrum of a background noise, subtracts the estimated background noise spectrum from the echo-canceled signal spectrum, and performs gain control of the echo-canceled signal spectrum at every band in response to the spectrum subtraction result, such that the non-linear processing unit may perform gain control without being affected by the background noise. A threshold calculation unit calculates a threshold value for each band so as to determine the presence or absence of a residual echo in the echo-canceled signal. The non-linear processing unit compares the spectrum subtraction result with the threshold value in each band. In association with a specific band where the spectrum subtraction result is higher than the threshold value, the non-linear processing unit determines that the echo-canceled signal is a near-end speaker sound, such that it controls the echo-canceled signal spectrum related to the specific band using a relatively high gain. In association with another specific band where the spectrum subtraction result is not higher than the threshold value, the non-linear processing unit determines that the echo-canceled signal is a residual echo, such that it controls the echo-canceled signal spectrum using a relatively low gain. As a result, even though the background noise is at a high level, the residual echo can be suppressed.

In a preferred form, the threshold calculation unit generates the threshold value for each of the frequency bands by multiplying a result of convolution calculation performed in the adaptive filter unit by a predetermined coefficient, the convolution calculation being performed by convoluting the reception signal with filter coefficients of the adaptive filter unit in a frequency domain. As a result, the convolution operation result of the adaptive filtering process can be efficiently utilized, such that the threshold calculation process can be simplified In a preferred form of the present invention, the non-linear processing unit controls the spectrum of the echo-canceled signal with the high gain which is set to a fixed value (for example, value 1) when the result of the spectrum subtraction is higher than the threshold value, and controls the spectrum of the echo-canceled signal with the low gain which has a variable value denoted by an equation [a predetermined gain× (the spectrum of the estimated background noise the spectrum of the echo-canceled signal)] when the result of the spectrum subtraction is not higher than the threshold value.

If the spectrum subtraction result is not higher than the threshold value, the residual echo is suppressed such that the background noise is ideally output at its own original level. As a result, the sound volume fluctuation or intermittence of the background noise caused by the gain control may not be generated, and the residual echo is suppressed, hence it is prevented that the call quality is deteriorated. In addition, the background noise very similar to the actual background noise is output. Thus, the embodiment of the present invention can allow the sound quality of the background noise heard at the far end to be more natural as compared to the other case in which the artificially-made pseudo background noise is used to process and output the sound.

The echo suppression apparatus may further include a noise suppression unit that estimates a noise signal contained in an output signal of the non-linear processing unit based on the output signal of the non-linear processing unit, and that suppresses the noise signal contained in the output signal to provide the transmission signal toward the far end.

Therefore, the noise-suppressed signal can be transmitted to the far end. In this case, since the non-linear processing unit controls the echo-canceled signal using a gain denoted by an equation [a predetermined gain×(the estimated background noise spectrum÷the echo-canceled signal spectrum)] when the spectrum subtraction result is not higher than the threshold value, the sound volume fluctuation caused by the gain control is suppressed. As a result, in a subsequent noise suppression process, the noise signal can be high-precisely estimated such that the noise can be stably suppressed.

In the embodiment of the present invention, the non-linear processing unit comprises a first calculator that subtracts the estimated spectrum of the background noise from the spectrum of the echo-canceled signal to provide the result of the spectrum subtraction, a second calculator that calculates the variable value of the low gain according to the equation, a selector that selects one of the fixed value of the high gain and the variable value of the low gain, and an amplifier that amplifies the spectrum of the echo-canceled signal with the selected one of the fixed value and the variable value. The non-linear processing unit comprises a further unit that averages or smoothes the variable value calculated by the second calculator so that the amplifier amplifies the echo chancel signal with the averaged or smoothed variable value.

As a result, modulation of the sound generated by an abrupt gain change is reduced such that the sound quality of the far end can be improved.

BRIEF DESCRIPTION OF THE DRAWINGS

FIG. 6 is an operation waveform diagram illustrating operations of a Non-Linear Processing (NLP) unit and a noise suppression unit shown in FIG. 1 in the case where the Non-Linear Processing (NLP) unit is configured as shown in FIG. 4.

DETAILED DESCRIPTION OF THE INVENTION

Figure 1:
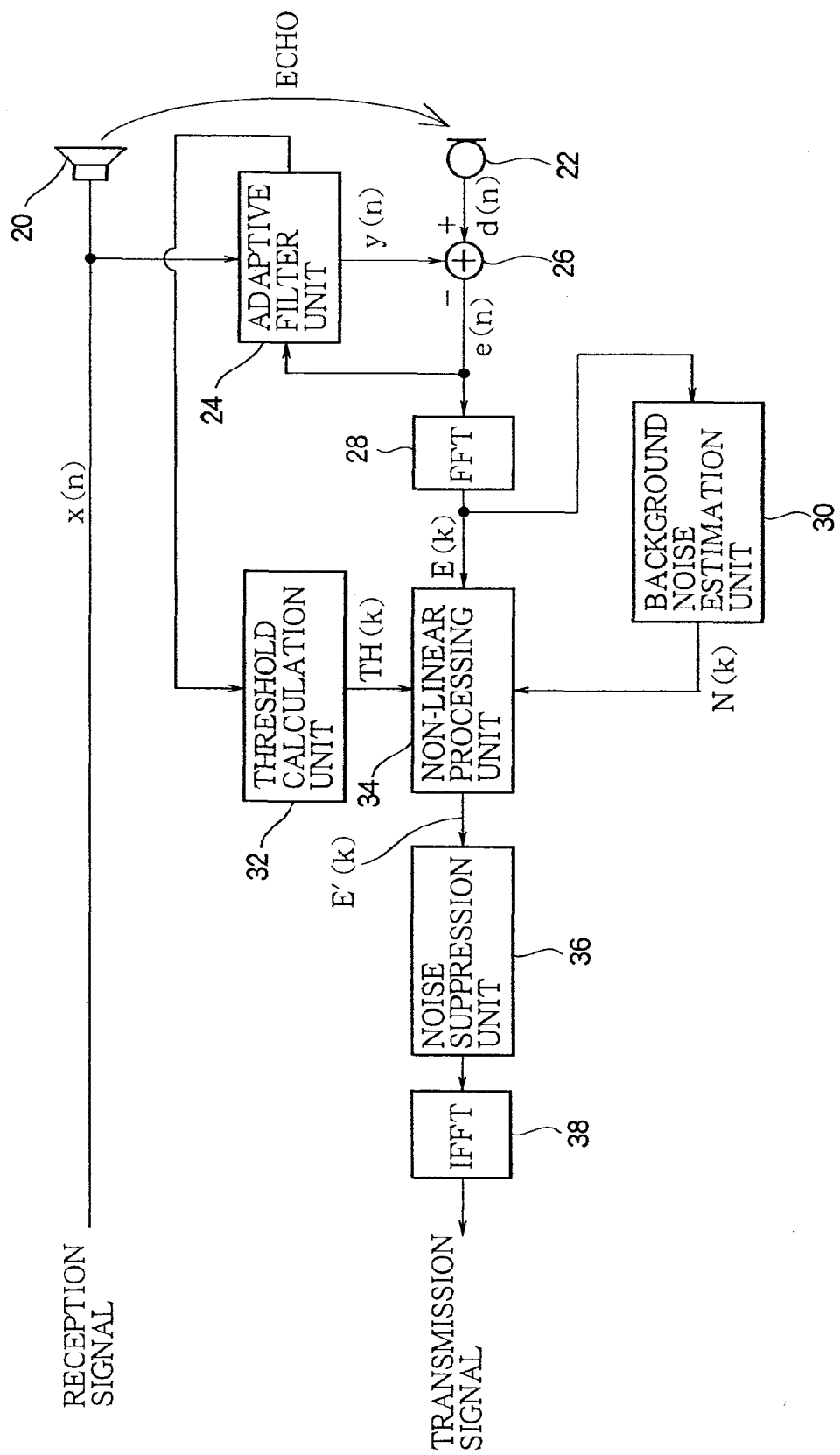
FIG. 1 is a schematic block diagram illustrating a system of a near end for use in a voice conference system according to an embodiment of the present invention.
Figure 2:
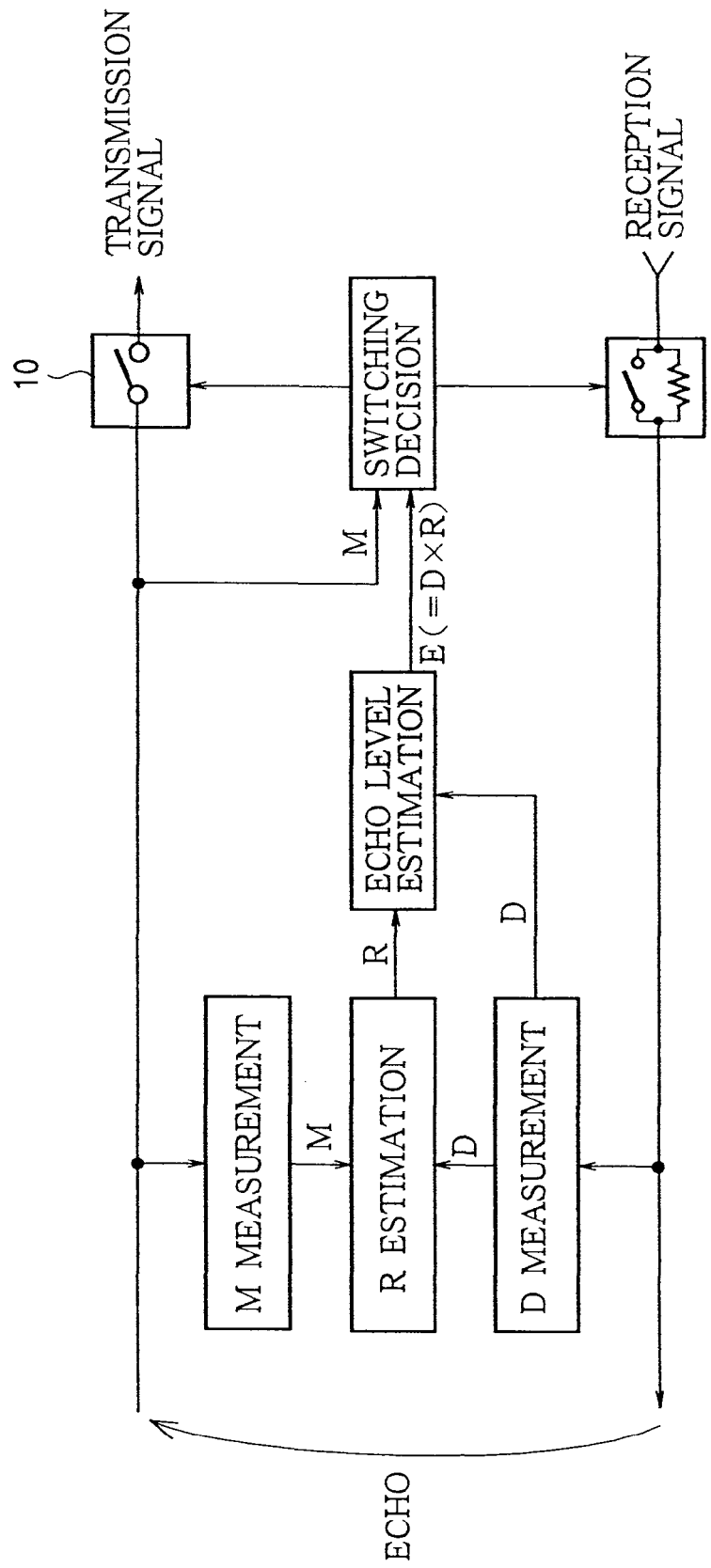
FIG. 2 is a block diagram illustrating a conventional echo suppression apparatus.
Figure 3:
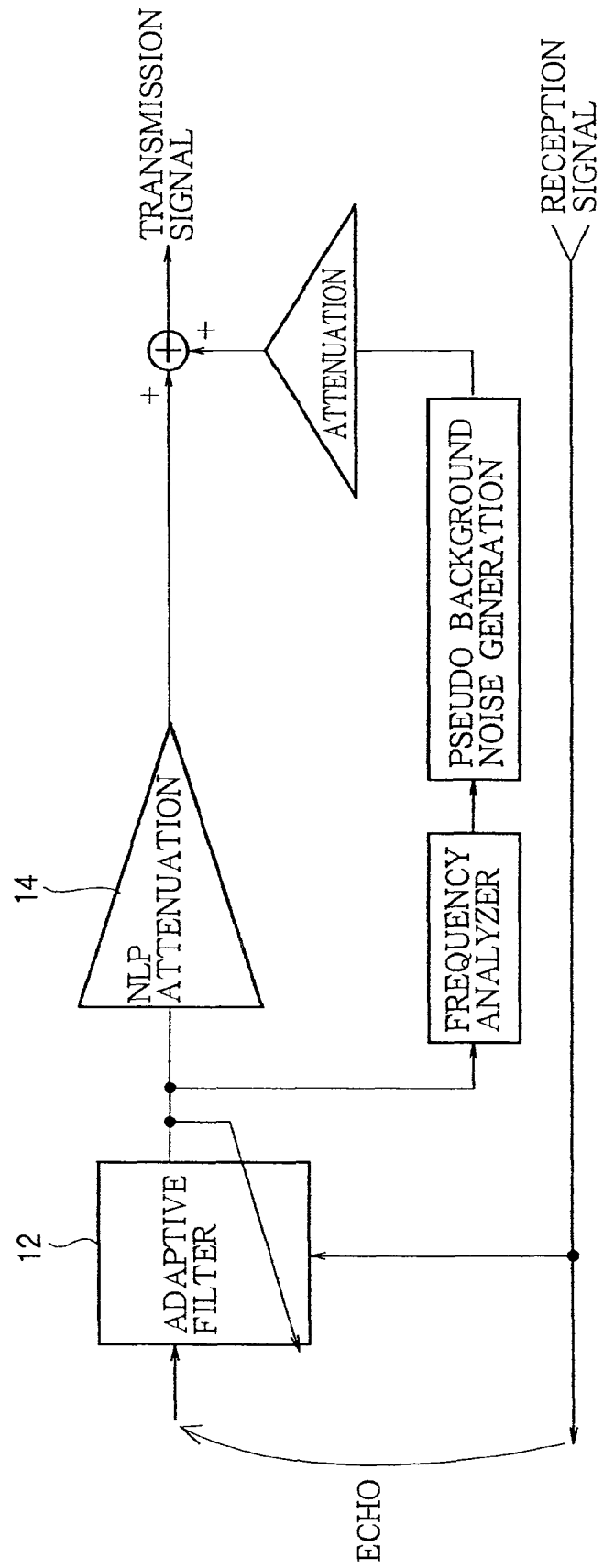
FIG. 3 is a block diagram illustrating another conventional echo suppression apparatus.

Embodiments of the invention will now be described with reference to the accompanying drawings. Corresponding elements in each figure will be denoted by like reference numerals and a redundant description thereof will be omitted. FIG. 1 is a schematic block diagram illustrating a configuration of a near end for use in a voice conference system according to an embodiment of the present invention. Referring to FIG. 1, a sound signal x(n) (a sampled signal of a time domain) provided from a far end and received by a near end is converted into an analog signal by a Digital/Analog (D/A) converter, such that the analog signal is reproduced through a speaker 20. A microphone 22 receives a voice signal of a near-end speaker, a sound echo of another voice signal reproduced through the speaker unit 20, and a near-end background noise. A sound pickup signal of the microphone 22 is converted into a time-domain sampled signal d(n) by an Analog/Digital (A/D) converter. A predetermined signal process is performed on the time-domain sampled signal d(n) at the near end, such that the resultant signal is transmitted to the far end.

A signal process to be performed on a sound pickup signal d(n) of the microphone 22 will hereinafter be described with reference to the annexed drawings. The adaptive filter unit 24 sequentially estimates an impulse response (transfer function) of echo path, performs a convolution operation between the estimated impulse response and the reception signal x(n), such that it generates a pseudo echo signal y(n). A well-known adaptation algorithm may be used for the adaptive filter unit 24. For example, a multidelay block frequency domain adaptive filter (MDF) method shown in Non-Patent Reference 1, a unconstrained multidelay block frequency domain adaptive filter (UMDF) method, and an alternative unconstrained multidelay block frequency domain adaptive filter (AUMDF) method may be used. The subtractor 26 subtracts a pseudo echo signal y(n) from the microphone signal d(n), such that it cancels an echo contained in the microphone signal d(n) and it generates an echo-canceled signal e(n). In the case where the adaptive filter unit 24 can perfectly estimate the impulse response of the echo path, the pseudo echo signal y(n) becomes completely identical to a real echo signal, such that the echo signal is completely removed from the microphone signal d(n). However, as a matter of fact, a disturbance signal such as a near-end speaker voice signal (i.e., near-end voice signal) and background noise may be present in the microphone signal d(n), such that the adaptive filter unit 24 has difficulty in completely estimating the impulse response of the echo path, and thus a residual echo (i.e., the remaining echo after cancellation) is included in the echo-canceled signal e(n). Therefore, the echo-canceled signal e(n) includes a near-end speaker voice signal, a near-end background noise, and a residual echo.

A Fast Fourier Transform (FFT) unit 28 performs an FFT process on the echo-canceled signal e(n), such that the FFT-processed resultant signal is converted into a frequency-domain signal. The background noise estimation unit 30 receives a spectrum E(k) (complex number) of the echo-canceled signal from the FFT unit 28, and estimates an amplitude spectrum N(k) (real number) of a near-end background noise in a frequency domain. In this case, the amplitude spectrum N(k) is contained in the amplitude spectrum |E(k)| of an absolute value (real number) of the echo-canceled signal E(k). A variety of algorithms related to a background noise estimation method have been proposed. For example, a method disclosed in Non-Patent Reference 2 may be used as a representative background noise estimation method.

The threshold calculation unit 32 utilizes the intermediate result (convolution operation result in a frequency domain) of the adaptive filter unit 24, such that it calculates a threshold value TH(k) (residual-echo estimated energy (amplitude spectrum) (real number)) of a non-linear process in each frequency band divided by the FFT process. In the case where a constituent element shown in Non-Patent Reference 1 is used as the adaptive filter unit 24, the threshold value TH(k) may be set to a specific value calculated by the following equations 1 and 2.

$$TH(k) = \gamma |Y(k)|$$ [Equation 1]

In Equation 1, Y(k) is a convolution operation result between a reception signal x(n) and an adaptive filter coefficient in the frequency domain.

$$Y(k) = \sum_{m=1}^{M} X(m,k) W(m,k)$$ [Equation 2]

In Equation 1, |Y(k)| is an absolute value (real number) of the convolution operation result Y(k), and is indicative of an amplitude spectrum. 'γ' may be set to a constant or predetermined coefficient that is slightly higher than the ratio of the residual echo and the absolute value |Y(k)| (i.e., residual echo÷|Y(k)|), such that the threshold value TH(k) may be set to a value slightly higher than the residual echo. For example, provided that the resultant value obtained by the above-mentioned expression 'residual echo÷|Y(k)|' is '0.1', 'γ' may be set to 'γ=0.125~0.15', such that the threshold value TH(k) may be set to be slightly higher than the residual echo, and the non-linear processing unit 34 to be described later may suppress the residual echo. In addition, with reference to Equation 2, X(m, k) is a Fast Fourier Transform (FFT) result at a k-th frequency bin of an m-th block (one section for dividing the reception signal x(n) in a time-axis direction so as to perform FFT process. FFT frame) of a reception signal x(n), and W(m, k) is an adaptive filter coefficient at a k-th frequency bin of an m-th block of a reception signal x(n), and 'M' is a total number of blocks. Also, the threshold value TH(k) may be calculated by not only the above-mentioned method shown in Equation 1 but also another method for multiplying the echo-signal estimated energy E shown in Patent Reference 1 by an appropriate coefficient, or may also be calculated by other available methods as necessary.

Figure 4:
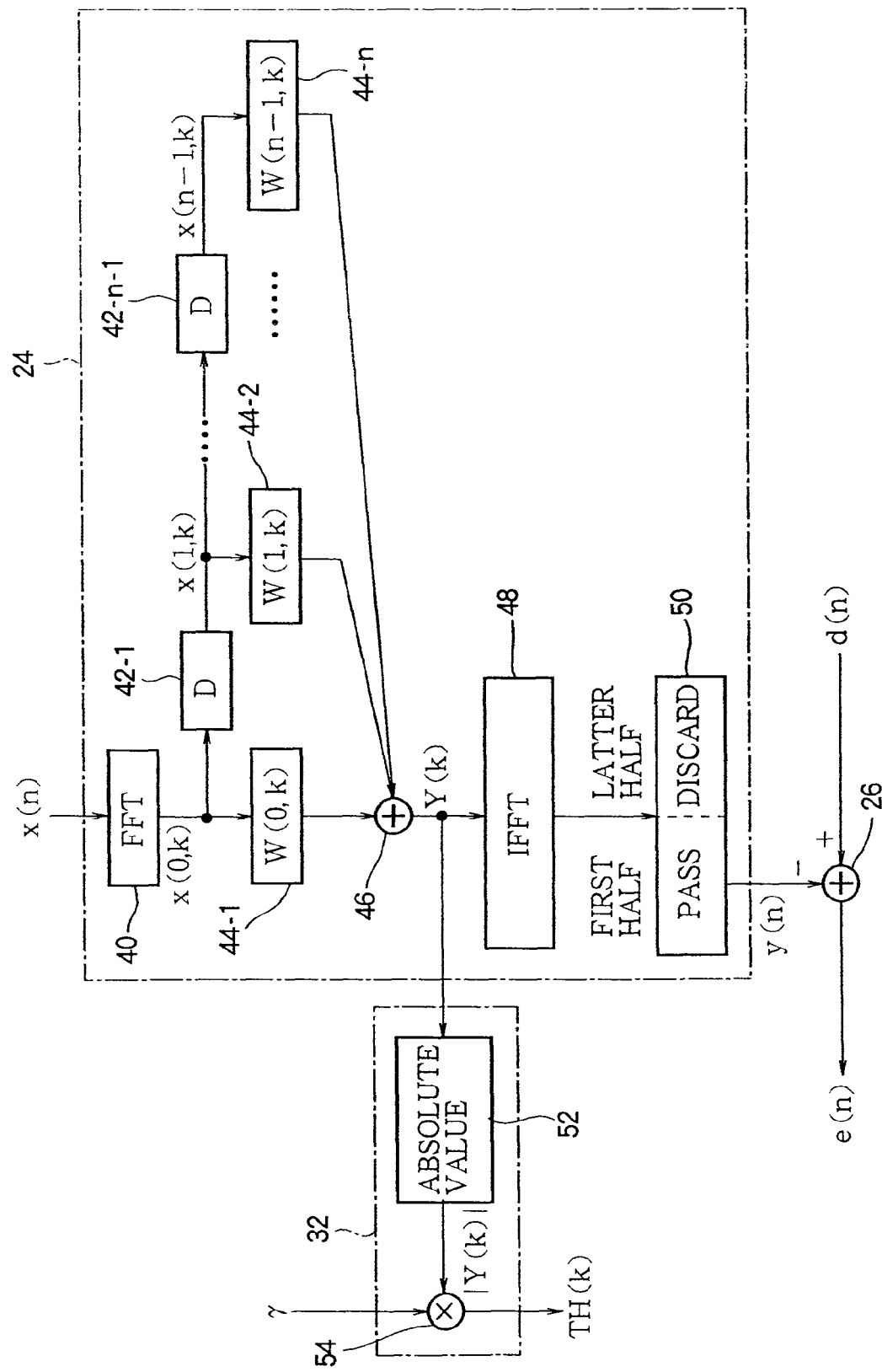
FIG. 4 is a block diagram illustrating exemplary configurations of an adaptive filter unit and a threshold calculation unit shown in FIG. 1.

In the case where the method shown in Non-Patent Reference 1 is used as an algorithm for the adaptive filter unit 24, and the threshold calculation unit 32 performs calculation processes of Equations 1 and 2 using the intermediate result of the adaptive filter unit 24, the adaptive filter unit 24 and the threshold calculation unit 32 can be configured as shown in FIG. 4. Referring to FIG. 4, in the adaptive filter unit 24, the FFT unit 40 performs FFT process on a sound signal x(n) (sampled signal in a time-domain) provided from a far end such that it converts the sound signal x(n) into a frequency-domain signal. The FFT-processed signal X(m, k) is delayed by one-block delays (42-1, 42-2, . . . , 42-n-1) one block by one block in the direction of a time axis. In a coefficient unit (44-1, 44-2, . . . , 44-n), an adaptive filter coefficient is multiplied, and the multiplied result is added by an adder 46, whereby the convolution operation is applied to k-th band of the sound signal x(n). The convolution operation result Y(k) is IFFT-processed (Inverse-FFT-processed) by the IFFT unit 48, such that it returns to a time-domain signal. The cutting part 50 cuts off an unnecessary latter half part from among a time-domain sample signal received from the IFFT unit 48, and then output the first half as a pseudo echo signal y(n). The subtractor 26 subtracts the pseudo echo signal y(n) from the microphone signal d(n) as described above, and cancels an echo contained in the microphone signal d(n), such that it generates an echo-canceled signal e(n).

The threshold calculation unit 32 receives a convolution operation result Y(k) as an intermediate result of the adaptive filter unit 24, the absolute-value unit 52 changes the received resultant value to an absolute value, such that it makes |Y(k)|. The multiplier 54 multiplies the value |Y(k)| by the constant (γ) to calculate the threshold value TH(k) of Equation 1.

In FIG. 1, the non-linear processing unit (residual echo suppression processor) 34 receives the background noise amplitude spectrum N(k) and the threshold value TH(k), leaves a background noise component N(k) contained in the echo-canceled signal amplitude spectrum |E(k)| at every band, and at the same time attenuates (suppresses) the residual echo component (residual echo amplitude spectrum). The noise suppression unit 36 receives an echo-canceled signal spectrum (E'(K)) having an attenuated residual echo component from the non-linear processing unit 34, estimates a noise component (noise signal amplitude spectrum) using the received echo-canceled signal spectrum (E'(K)), and suppresses the noise component. The background noise component N(k) ideally remains in the input signal of the noise suppression unit 36 without any change, and there is no sound volume fluctuation of the background noise component N(k) caused by the residual echo suppression, such that the noise suppression unit 36 estimates the noise component at a high-precision level, and thus stably performs noise suppression. This noise suppression process may use well-known methods. For example, spectrum subtraction or a Wiener filter-based scheme may be used. The output signal of the noise suppression unit 36 has suppressed residual echo and suppressed background noise, is IFFT-processed by the IFFT unit 38, returns to a time-domain signal, and is then transmitted to the far end. In addition, an artificially-made pseudo background noise may be properly added to the above transmission signal, and the added result may be transmitted.

Figure 5:
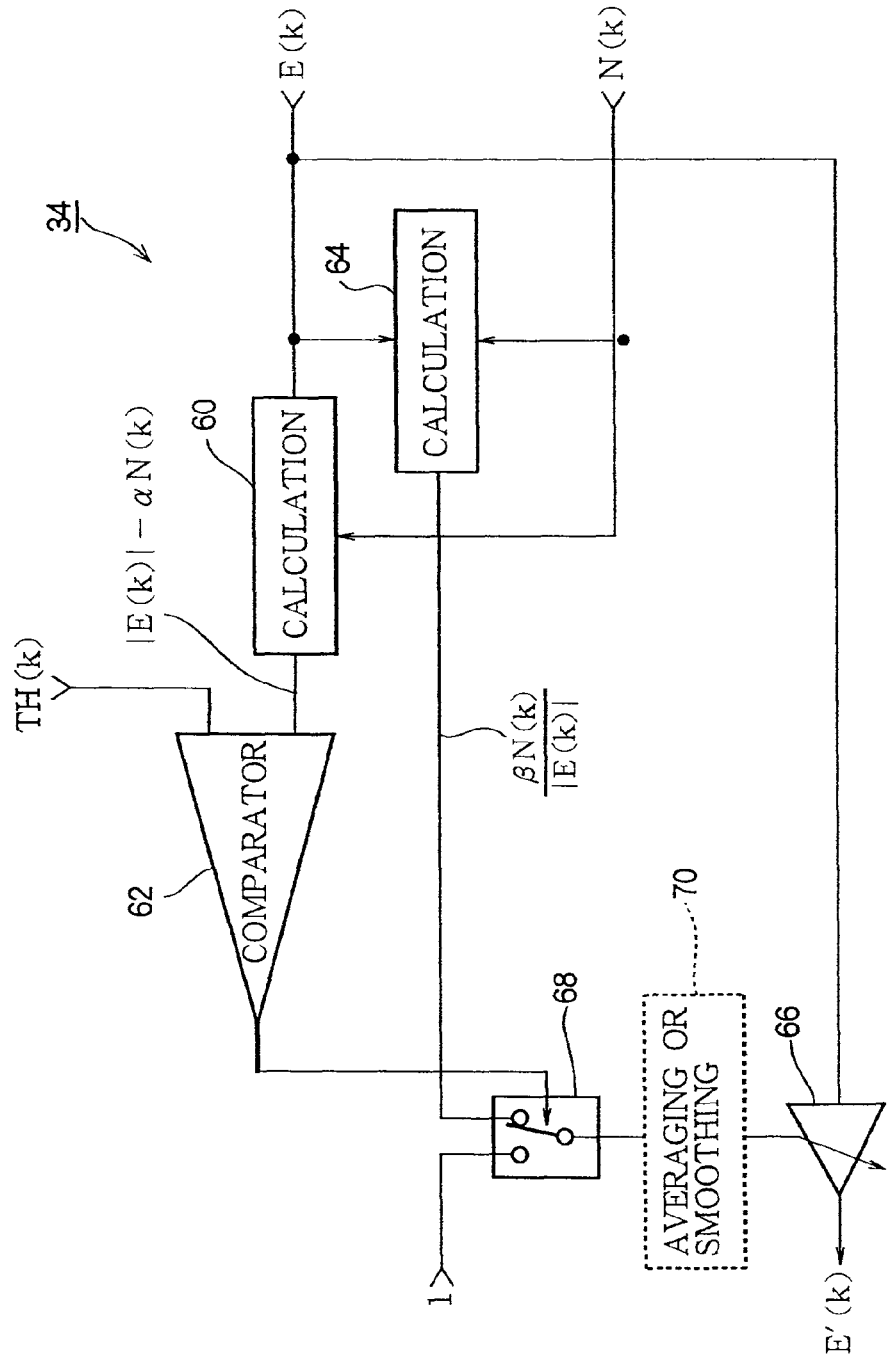
FIG. 5 is a functional block diagram illustrating process details of a Non-Linear Processing (NLP) unit shown in FIG. 1.

The processing of the non-linear processing unit 34 is shown in FIG. 5. This processing may be carried out in each band being divided by FFT. The calculation unit 60 (first calculator) receives the echo-canceled signal amplitude spectrum |E(k)| and the background noise amplitude spectrum N(k), performs spectrum subtraction on the received spectrums, such that it calculates the result of |E(k)|−αN(k). As a result, the background noise amplitude spectrum N(k) contained in the echo-canceled signal amplitude spectrum |E(k)| is removed. In this case, α is a subtraction coefficient, and is adjusted by an estimation precision of the noise estimation algorithm used in the background noise estimation unit 30 shown in FIG. 1. For example, in the case where the noise estimation algorithm tends to excessively estimate the background noise amplitude spectrum N(k), α is denoted by '0<α<1'. Otherwise, if the noise estimation algorithm tends to underestimate the background noise amplitude spectrum N(k), α is denoted by 'α>1'. If the noise estimation algorithm can accurately estimate the background noise amplitude spectrum N(k), α is just set to α=1. The comparator 62 compares the spectrum subtraction result (|E(k)|−αN(k)) with the threshold value TH(k) in every band k, and determines whether the spectrum subtraction result |E(k)|−αN(k) is denoted by '|E(k)|−αN(k)>TH(k)' or '|E(k)|−αN(k)1 TH(k)'. The calculation unit 64 (second calculator) calculates the ratio (βN(k)÷|E(k)|) of the background noise spectrum N(k) and the echo-canceled signal amplitude spectrum |E(k)|. In this case, β is a parameter for adjusting the degree or depth of the residual echo suppression of the non-linear processing unit 34, may be statically preset to an experimentally determined value, or may also be established on the basis of an external input. If required, β may also be variably established by a user in the case where the above-mentioned echo suppression apparatus is used. For example, β may be set to '1'.

A gain of the echo-canceled signal spectrum E(k) is controlled by a variable attenuation unit (variable amplifier) 66. A gain controller (gain selector) 68 switchably controls the gain G(k) of the variable attenuation unit 66 in response to output signals of the comparator 62 and the calculation unit 64 using the following equations 3a and 3b.

$$G(k)=1 \text{ (If } |E(k)|-\alpha N(k)>TH(k))$$ [Equation 3a]

$$G(k)=\beta N(k) \div |E(k)| \text{ (If } |E(k)|-\alpha N(k) \leq TH(k))$$ [Equation 3b]

In Equations 3a and 3b, G(k) is a gain (residual echo suppression gain) given to a k-th frequency bin, |E(k)| is the input signal amplitude spectrum of the non-linear processor (echo-canceled signal amplitude spectrum) at a k-th frequency bin, N(k) is a background noise amplitude spectrum estimated at the k-th frequency bin, TH(k) is an estimated energy (amplitude spectrum) of a residual echo and is indicative of a threshold value of a non-linear process, α is a subtraction coefficient, and β is a parameter for adjusting degree or depth of the residual echo suppression.

In Equation 3a, in the case where the spectrum subtraction resultant value (|E(k)|−αN(k)) is higher than a threshold value TH(k), the echo-canceled signal e(n) is considered to be near-end speaker's voice or sound, such that the echo-canceled signal spectrum E(k) passes through the variable attenuation unit 66 without any change. In Equation 3b, in the case where the spectrum subtraction resultant value (|E(k)|−αN(k)) is less than the threshold value TH(k), the echo-canceled signal e(n) is considered to be residual echo, such that the echo-canceled signal spectrum E(k) is attenuated and output. In Equation 3b, in the case where the echo-canceled signal spectrum E(k) is attenuated and output, the gain G(k) is calculated as the ratio (βN(k)÷|E(k)|) of the background noise amplitude spectrum N(k) and the echo-canceled signal amplitude spectrum, such that the echo-canceled signal E(k) can be suppressed down to the level of the background noise amplitude spectrum N(k). That is, the signal spectrum E'(k) in which the echo-canceled signal spectrum E(k) is attenuated is represented by the following expression.

$$E'(k) = E(k) \times (\beta N(k) \div |E(k)|)$$ [Expression]
$$= (E(k) \div |E(k)|) \times \beta N(k)$$

In the above expression, (E(k)÷|E(k)|) means that the amplitude is set to 1 and the phase is identical to that of the echo-canceled signal E(k), such that the attenuated signal spectrum E'(k) shows that the amplitude of the background noise amplitude spectrum N(k) is unchanged and the phase thereof is set to that of the echo-canceled signal E(k). Therefore, in spite of conversion of not only the gain G(k) conversion caused by the threshold value TH(k) but also the gain G(K) variation caused by the ratio (βN(k)÷|E(k)|), the background noise amplitude spectrum N(k) is output without any change, such that sound volume fluctuation or intermittence of the background noise is not generated and at the same time the residual echo can be suppressed.

The variable attenuation unit 66 outputs the residual echo suppression signal spectrum E'(k) in which the residual echo is suppressed by the control of the gain G(k), such that the output signal of the non-linear processing unit 34 of the residual echo suppression signal spectrum E'(k) becomes an output signal of the non-linear processing unit 34. In order to improve sound quality of the near end by reducing modulation generated by an abrupt change of the gain G(k), an averaging or smoothing processing unit 70 is arranged at the output side of the gain controller 68 as denoted by a dotted line of FIG. 5. The gain G(k) calculated by Equations 3a and 3b may be averaging-processed or smoothing-processed in the time-axis direction and/or the frequency-axis direction.

The gain caused by the non-linear processing shown in Patent Reference 1 can be represented by the following equations 4a and 4b.

$$G(k)=1 \text{ (If } |E(k)|>TH(k))$$ [Equation 4a]

$$G(k)=0 \text{ (If } |E(k)| \leq TH(k))$$ [Equation 4b]

If there is no background noise in the near end, the technical method shown in Patent Reference 1 may be used without any problems. If the background noise is present in the near end, the method shown in Patent Reference 1 has the higher possibility of generating the miss-operation caused by the near-end background noise when deciding whether a signal is near-end speaker's voice or echo, such that the possibility of transmitting the echo having no suppression is very high. In accordance with the method shown in Patent Reference 1, gain G(k) is set only to '1' or '0', such that the background noise transmitted to the far end becomes intermittent, such that the sound generated from the far end is very much displeased. In contrast, the method used in the embodiment of the present invention estimates the near-end background noise, and determines whether a sound signal is near-end speaker sound or residual echo on the basis of the echo-canceled signal amplitude spectrum having no background noise, thereby preventing the objective signal from being affected by the near-end background noise. Even when the near-end background noise is at a high level, the embodiment of the present invention may not cause the miss-operation, such that the residual echo can be high-precisely suppressed. The non-linear processing unit 34 outputs an original-level background noise even when it determines the echo-canceled signal to be a residual echo and the residual echo is suppressed. As a result, the sound volume fluctuation or intermittence of the background noise is not generated and at the same time the residual echo can be suppressed. Therefore, the noise signal can be high-precisely estimated at the noise suppression unit 36 of the subsequent stage, such that the noise suppression can be stably carried out.

FIG. 6 shows operations of the non-linear processing unit 34 and the noise suppression unit 36 when the non-linear processing unit 34 is configured as shown in FIG. 4. For convenience of description, respective signals shown in FIG. 6 are denoted by time-domain waveforms. FIG. 6(*a*) shows an echo-canceled signal amplitude spectrum |E(k)|, a background noise amplitude spectrum N(k) contained in the echo-canceled signal E(k), and a threshold value TH(k). FIG. 6(*a*) shows that the background noise amplitude spectrum N(k) is at a high level, and the comparison between the echo-canceled signal amplitude spectrum |E(k)| and the threshold value TH(k) is unable to identify a specific duration having no near-end speaker sound, such that the residual echo of a corresponding signal is not suppressed in the specific duration and is transmitted to the far end without any suppression.

FIG. 6(*b*) shows not only the amplitude spectrum subtraction result (|E(k)|−αN(k)) generated from the first calculation unit 60 but also the threshold value TH(k). In FIG. 6(*b*), the signal obtained when the background noise amplitude spectrum N(k) is subtracted from the echo-canceled signal amplitude spectrum |E(k)| is compared with the threshold value TH(k), such that the duration having no near-end speaker sound is correctly identified.

FIG. 6(*c*) shows the variable attenuation unit 66 controlled by the comparison result of FIG. 6(*b*). In FIG. 6(*c*), the gain G(k) is set to '1' in a section having the near-end speaker sound, and is set to βN(k)÷|E(k)| in another section having no near-end speaker sound.

FIG. 6(*d*) shows an amplitude spectrum |E'(k)| of the output signal of the variable attenuation unit 66 under the gain control. In FIG. 6(*d*), the hatching part is indicative of an amplitude spectrum N(k) of a background noise contained in the amplitude spectrum |E'(k)|. In the section having the near-end speaker sound, the echo-canceled signal E(k) passes through the variable attenuation unit 66 without any change. In the other section having no near-end speaker sound, the residual echo is suppressed, while the background noise is not suppressed and is output from the variable attenuation unit 66. Therefore, although the gain is converted or fluctuated, there is no sound volume fluctuation in the background noise. FIG. 6(*e*) shows an amplitude spectrum of the output signal (See FIG. 1) of the noise suppression unit 36.

In FIG. 6(*e*), the background noise N(k) is suppressed in the entire section, such that only the near-end speaker sound is output. The near-end speaker sound in which the residual echo and the background noise are suppressed is IFFT-processed by the IFFT unit 38, and returns to a time-domain signal, and the time-domain signal is transmitted to the far end.

(Other Embodiments)

Although the above-mentioned embodiment has used the amplitude spectrum in the calculation process of the non-linear processing unit 34, it should be noted that the power spectrum may also be used. In the case of using the power spectrum, a threshold value TH'(k) shown in the following equation 1' is used instead of the above-mentioned threshold value TH(k) shown in Equation 1.

$$TH'(k)=\gamma'|Y(k)|^2 \qquad \text{[Equation 1']}$$

In Equation 1', γ' is a constant or predetermined coefficient slightly lower than the ratio of the residual echo and the value of |Y(k)|, and is experimentally decided. Y(k) is calculated by Equation 2. In addition, in the case of using the power spectrum, the gain G(k) of the variable attenuation unit 66 can be controlled by the following equations 3a' and 3b'.

$$G(k)=1 \text{ (In case of } |E(k)|^2-\alpha|N(k)|^2>TH'(k)) \qquad \text{[Equation 3a']}$$

$$G(k)=\beta(|N(k)|^2+|E(k)|^2)^{1/2} \text{ (In case of } |E(k)|^2-\alpha|N(k)|^2 \leq TH'(k)). \qquad \text{[Equation 3b']}$$

In Equations 3a' and 3b', |E(k)|² is an input signal power spectrum of the non-linear processor (echo-canceled signal power spectrum) at a k-th frequency bin, and N(k) is a background noise power spectrum estimated at the k-th frequency bin.

In accordance with the above-mentioned embodiment of the present invention, although the background noise estimation unit 30 has estimated the background noise on the basis of the signal e(n) made after the echo cancellation, it should be noted that the background noise estimation unit 30 may also estimate the background noise on the basis of the signal d(n) made before the echo cancellation. In addition, although the above-mentioned embodiment operates such that the output signal of the non-linear processing unit 34 is noise-suppressed by the noise suppression unit 36 and is then transmitted to the far end, it should be noted that the output signal of the non-linear processing 34 can be transmitted to the far end without noise suppressing.

The invention claimed is:

1. An echo suppression apparatus comprising:
    an adaptive filter unit that estimates an echo path of a near end, and that generates a pseudo echo signal of a reception signal received from a far end;
    a subtractor that subtracts the pseudo echo signal from a near-end signal including an echo signal of the reception signal, a near-end sound and a background noise, and that generates an echo-canceled signal as a result of subtraction;
    a background noise estimation unit that estimates a spectrum of the background noise;
    a non-linear processing unit that performs spectrum subtraction to subtract the estimated spectrum of the background noise from a spectrum of the echo-canceled signal, and that controls a gain of the spectrum of the echo-canceled signal for each of frequency bands of the spectrum of the echo-canceled signal in response to a result of the spectrum subtraction, thereby obtaining a spectrum of a transmission signal transmitted to the far end; and
    a threshold calculation unit that calculates a threshold value for each of the frequency bands, the threshold value being used to determine presence or absence of a residual echo in the echo-canceled signal, wherein the non-linear processing unit compares the result of the spectrum subtraction with the threshold value in each of the frequency bands, then controls the spectrum of the echo-canceled signal with a high gain in a frequency band where the result of the spectrum subtraction is higher than the threshold value, and controls the spectrum of the echo-canceled signal with a low gain in another frequency band where the result of the spectrum subtraction is not higher than the threshold value, the low gain being set to lower than the high gain.

2. The echo suppression apparatus according to claim 1, wherein the non-linear processing unit controls the spectrum of the echo-canceled signal with the high gain which is set to a fixed value when the result of the spectrum subtraction is higher than the threshold value, and controls the spectrum of the each echo-canceled signal with the low gain which has a variable value denoted by an equation [a predetermined gain× (the spectrum of the estimated background noise÷the spectrum of the echo-canceled signal] when the result of the spectrum subtraction is not higher than the threshold value.

3. The echo suppression apparatus according to claim 2, wherein the non-linear processing unit comprises a first calculator that subtracts the estimated spectrum of the background noise from the spectrum of the echo-canceled signal to provide the result of the spectrum subtraction, a second calculator that calculates the variable value of the low gain according to the equation, a selector that selects one of the fixed value of the high gain and the variable value of the low gain, and an amplifier that amplifies the spectrum of the echo-canceled signal with the selected one of the fixed value and the variable value.

4. The echo suppression apparatus according to claim 3, wherein the non-linear processing unit comprises a further unit that averages or smoothes the variable value calculated by the second calculator so that the amplifier amplifies the echo chancel signal with the averaged or smoothed variable value.

5. The echo suppression apparatus according to any one of claims 1 to 4, further comprising a noise suppression unit that estimates a noise signal contained in an output signal of the non-linear processing unit based on the output signal of the non-linear processing unit, and that suppresses the noise signal contained in the output signal to provide the transmission signal toward the far end.

6. The echo suppression apparatus according to any one of claims 1 to 5, wherein the threshold calculation unit generates the threshold value for each of the frequency bands by multiplying a result of convolution calculation performed in the adaptive filter unit by a predetermined coefficient, the convolution calculation being performed by convoluting the reception signal with filter coefficients of the adaptive filter unit in a frequency domain.

7. An echo suppression method comprising:
an adaptive filtering process of estimating an echo path of a near end, and generating a pseudo echo signal of a reception signal received from a far end;
a subtracting process of subtracting the pseudo echo signal from a near-end signal including an echo signal of the reception signal, a near-end sound and a background noise, and generating an echo-canceled signal as a result of subtraction;
a background noise estimating process of estimating a spectrum of the background noise;
a non-linear process of performing spectrum subtraction to subtract the estimated spectrum of the background noise from a spectrum of the echo-canceled signal, and controlling a gain of the spectrum of the echo-canceled signal for each of frequency bands of the spectrum of the echo-canceled signal in response to a result of the spectrum subtraction, thereby obtaining a spectrum of a transmission signal transmitted to the far end; and
a threshold calculating process of calculating a threshold value for each of the frequency bands, the threshold value being used to determine presence or absence of a residual echo in the echo-canceled signal,
wherein the non-linear process compares the result of the spectrum subtraction with the threshold value in each of the frequency bands, then controls the spectrum of the echo-canceled signal with a high gain in a frequency band where the result of the spectrum subtraction is higher than the threshold value, and controls the spectrum of the echo-canceled signal with a low gain in another frequency band where the result of the spectrum subtraction is not higher than the threshold value, the low gain being set to lower than the high gain.

* * * * *